United States Patent
Mechteridis et al.

(10) Patent No.: US 12,013,037 B2
(45) Date of Patent: Jun. 18, 2024

(54) SEAL FOR AN ELECTRICAL CONNECTOR WITH REDUCED INSERTION FORCE

(71) Applicant: TE Connectivity Germany GmbH, Bensheim (DE)

(72) Inventors: Dimitrios Mechteridis, Bensheim (DE); Andreas Walz, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 0 days.

(21) Appl. No.: 17/851,370

(22) Filed: Jun. 28, 2022

(65) Prior Publication Data
US 2022/0412463 A1 Dec. 29, 2022

(30) Foreign Application Priority Data
Jun. 29, 2021 (DE) .......................... 102021116675.6

(51) Int. Cl.
*F16J 15/3232* (2016.01)

(52) U.S. Cl.
CPC ................................ *F16J 15/3232* (2013.01)

(58) Field of Classification Search
CPC .... F16J 15/00; F16J 15/02; F16J 15/48; F16J 15/16; F16J 15/50; F16J 15/52; F16J 15/3204; F16J 15/3216; F16J 15/322; F16J 15/3232; F16J 15/3236
USPC ....................................................... 277/562
See application file for complete search history.

(56) References Cited

U.S. PATENT DOCUMENTS

| 4,426,095 A * | 1/1984 | Buttner ................. F16L 41/088 277/606 |
| 6,264,206 B1 | 7/2001 | Hashizawa et al. |
| 2007/0232141 A1* | 10/2007 | Tyler .................... H01R 13/187 439/595 |

FOREIGN PATENT DOCUMENTS

| CN | 104112942 A | 10/2014 | |
| EP | 0386516 B1 | 9/1990 | |
| EP | 3442083 A1 * | 2/2019 | ......... H01R 13/5219 |
| EP | 3442083 B1 | 6/2020 | |
| JP | 2018014214 A * | 1/2018 | |
| JP | 2018014214 A | 1/2018 | |
| JP | 2021026907 A | 2/2021 | |
| JP | 2021077566 A | 5/2021 | |
| WO | 2021095475 A1 | 5/2021 | |
| WO | WO-2021095475 A1 * | 5/2021 | |

OTHER PUBLICATIONS

Extended European Search Report dated Nov. 14, 2022, corresponding to Application No. 22181718.2-1201, 7 pages.
German Office Action, Application No. 102021116675.6, dated Feb. 25, 2022, 5 pages.

* cited by examiner

*Primary Examiner* — Nathan Cumar
(74) *Attorney, Agent, or Firm* — Barley Snyder

(57) ABSTRACT

A seal for an electrical connector includes a sealing surface, a bearing surface opposite the sealing surface, a plurality of sealing lips protruding on the sealing surface next to one another, a plurality of support lips protruding on the bearing surface, and a plurality of recesses on the bearing surface between the support lips. Each of the sealing lips is opposite one of the recesses.

18 Claims, 3 Drawing Sheets

SEAL FOR AN ELECTRICAL CONNECTOR WITH REDUCED INSERTION FORCE

CROSS-REFERENCE TO RELATED APPLICATIONS

This application claims the benefit of the filing date under 35 U.S.C. § 119(a)-(d) of German Patent Application No. 102021116675.6, filed on Jun. 29, 2021.

FILED OF THE INVENTION

The invention relates to a seal for an electrical connector.

BACKGROUND

Electrical connectors are used in numerous fields of technology to create detachable connections for the transmission of electrical currents and/or signals. For this purpose, the electrical connectors may be mated with a mating connector. For reasons of electrical safety and for improved handling, the electrical connectors usually have a respective housing with an interior, from which electrically conductive contact elements emerge, thereby establishing mutual electrical contact of the connectors to be connected to one another. Electrical connectors are used in vehicles in various fields and are exposed to harsh environmental conditions. To prevent liquids and/or dirt from penetrating into the interior of the housing, a seal is provided between the connector and the mating connector. The problem, however, is that a high insertion force must be overcome to push the mating connector past the seal.

SUMMARY

A seal for an electrical connector includes a sealing surface, a bearing surface opposite the sealing surface, a plurality of sealing lips protruding on the sealing surface next to one another, a plurality of support lips protruding on the bearing surface, and a plurality of recesses on the bearing surface between the support lips. Each of the sealing lips is opposite one of the recesses.

BRIEF DESCRIPTION OF THE DRAWINGS

The invention will now be described by way of example with reference to the accompanying Figures, of which.

DETAILED DESCRIPTION OF THE EMBODIMENT(S)

Hereinafter, the invention is described in more detail by way of examples of embodiments with reference to the accompanying figures. In the figures, elements corresponding to one another in terms of structure and/or function are provided with the same reference signs.

The combinations of features shown and described in the individual exemplary embodiments are for explanatory purposes only. A feature of an embodiment may be omitted if its technical effect is not important for a particular application. Conversely, an additional feature may be added to an embodiment if its technical effect is advantageous or necessary for a particular application.

Figure 1:
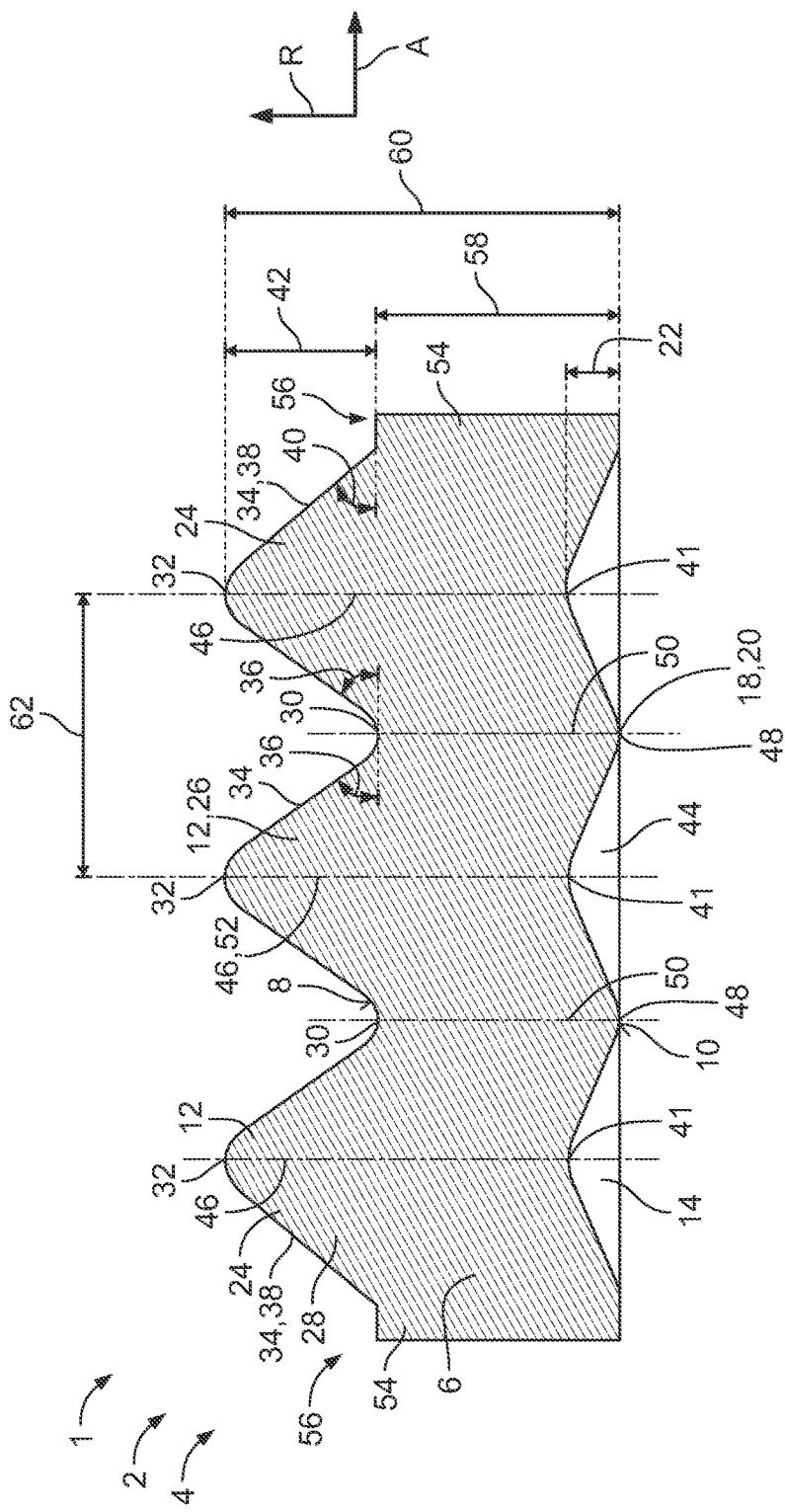
FIG. 1 is a schematic sectional view of a seal according to an embodiment.

In FIG. 1, a seal 1, formed from an elastomer in an embodiment, is shown in an axial sectional plane arranged substantially parallel to the drawing plane. In this exemplary embodiment, the seal 1 is configured as a sealing ring 2 in the form of a radial seal 4. For clarity, the circumferential lines are not drawn in the figures. The seal 1 may be configured to be rotationally symmetrical about a central axis, which is why only one section of the seal 1 is shown in each of the figures. The seal 1 may be formed in one piece as a monolithic component 6.

The seal 1 includes a sealing surface 8 and a bearing surface 10 opposite the sealing surface 8. A plurality of sealing lips 12 protrude from the sealing surface 8, while the bearing surface 10 is provided with recesses 14 arranged between protruding support lips 18. In this case, the support lips 18 are arranged offset from the sealing lips 12, with the sealing lips 12 being arranged opposite a recess 14. In particular, each sealing lip 12 may face exactly one recess 14.

The elasticity of the seal 1 may be improved by the mutually offset arrangement of the support lips 18 and the sealing lips 12. If the sealing lip 12 is pressed in the direction towards the bearing surface 10, the support lips 18 act like contact faces 20 in a bending beam. Consequently, the force acting on the sealing lip 12 may be redirected to adjacent contact faces 20, allowing the sealing lip 12 to deflect in the direction of the recess 14. In this case, the recess 14 bulges, causing a depth 22 of the recess 14 to decrease. The depth 22 may decrease, for example, such that in the mated state shown in FIG. 3, it abuts the connector.

In the exemplary embodiment, the seal 1 is shown as a radial seal 4. In an alternative embodiment not shown, the seal 1 may also be configured as an axial seal. In this case, the sealing lips 12 would not project in the radial direction, as will be described below, but in the axial direction.

In the radial seal 4, the sealing surface 8 is arranged radially on the outside and the bearing surface 10 is arranged radially on the inside. Here, three sealing lips 12 are provided that are spaced axially from one another and project radially outwards. Two sealing lips 24 of the three sealing lips 12 are arranged on the outside in the axial direction A and a central sealing lip 26 is arranged between the outer sealing lips 24. It is also possible, however, for the seal 1 to have more than three sealing lips 12, in which case the number of central sealing lips 26 arranged between the outer sealing lips 24 increases.

In an alternative embodiment, the radially outer side of the sealing ring 2 may form the bearing surface 10 and the radially inner side may form the sealing surface 8. Consequently, the sealing lips 12 may protrude in a radial direction on the sealing surface side.

The seal 1 may also be configured as an end face seal, in which case the sealing surface 8 and bearing surface 10 are each formed by a front face pointing in the insertion direction and a rear face pointing away from the insertion direction. In this case, the sealing lips 12 protrude in the axial direction A.

For the purposes of the application, the description of the features of the seal 1 may refer to an non-deformed state of the seal 1 unless otherwise indicated.

In an embodiment, the sealing lips 12 are arranged in such a way that adjacent sealing lips 12 converge, at their base 28 facing the bearing surface 10, towards a common base 30. Consequently, the seal at the sealing surface 8 may have a substantially undulating, in particular sinusoidal, profile with stepless transitions. In particular, the sealing lips 12 may be substantially triangular in shape, converging outwardly in the radial direction R to a vertex 32.

In an embodiment, the central sealing lip 26 is symmetrical, in particular it has a cross-section of a substantially isosceles triangle, so that both legs 34 converge at the same angle 36 to the vertex 32.

The exterior sealing lips 24, or at least one of the exterior sealing lips 24, may have a substantially asymmetrical configuration. In order to prevent the outer sealing lip 24 from being pulled along by the mating connector during the mating process, the exterior sealing lip 24 may form an approach bevel 38 with its leg 34 pointing away from the remaining sealing lips 12 in the axial direction A. The leg 34 of the exterior sealing lip 24 may be configured in such a way that it may be pulled along by the mating connector during the mating process. In this case, the leg 34 is configured in such a way that it tapers towards the vertex at a shallower angle 40 than the angle 36, at which the legs 34 of the central sealing lip 26 taper towards the vertex 32. In an embodiment, the leg 34 of the exterior sealing lip 24 facing the central sealing lip 26 may taper towards the vertex 32 at the same angle 36 as the legs 34 of the central sealing lip 24. The sealing lips 12 may taper in a step-free manner toward the vertex 32 such that the sealing surface 8 has an undulating profile, in particular a sinusoidal profile. If the sealing surface 8 and the bearing surface 10 each have a sinusoidal profile, at least in sections, the sinusoids may be arranged parallel to one another.

The recesses 14 in the bearing surface 10 also have a substantially triangular cross-section with the recesses 14 tapering towards a base 41 in the direction of the sealing surface 8. The recesses 14 may taper continuously toward the base 41 in the direction of the sealing surface 8. In particular, the support lips 18 and the recesses 14 may merge into one another without any steps, so that the bearing surface 8 has a corrugated, in particular sinusoidal profile, at least in sections.

The depth 22 of the recesses 14 may be less, in particular, than a height 42 of the sealing lips 12 in the radial direction R. The recesses 14 form an escape reservoir 44, into which the material of the seal 1 may be deflected inwardly when the sealing lips 12 are subjected to a load in the radial direction R.

An optimum arrangement of the recesses 14 is obtained when the bases 41 of the recesses 14 are located on an alignment line 46 with respect to the vertices 32 of the seal lips 12, the alignment line 46 being arranged substantially parallel to the radial direction R in the case of the radial seal 4. In each case, a recess 14 may be associated with a sealing lip 12. The recesses 14 may each have the same depth 22 and widen radially inwards from the corresponding bases 41. In this case, support lips 18 are arranged between the recesses 14 and form a vertex 48 on the bearing surface 10, with which the seal 1 may bear against the connector in the non-deformed state. In an embodiment, the recesses 14 transition into the support lips 18 substantially without steps.

The vertices 48 of the corresponding support lips 18 may be positioned in such a way that they are arranged with the bases 30 between the sealing lips 12 on an alignment line 50 that extends substantially parallel to the radial direction R. This results in an optimum arrangement of the sealing lips 12 and the support lips 18, thereby allowing to further increase the elasticity of the seal 1. Consequently, the insertion forces required to mate the connector with the mating connector may be further reduced.

To prevent the seal 1 from being inserted in an incorrect position on the connector, the seal 1 may be symmetrical, in particular axially symmetric. Therefore, the seal 1 has an axis of symmetry 52 arranged parallel to the alignment line 46 extending through the central sealing lip 26. In particular, the axis of symmetry 52 may overlap with the alignment line 46 extending through the central sealing lip 26.

To improve the fit of the seal 1 to the connector, the seal 1 may be provided with axially projecting stop shoulders 54. The at least one stop shoulder 54 may protrude at one of the two ends of the seal 1 substantially in a direction perpendicular to the sealing lip 12, in particular perpendicular to a height line of the sealing lips 12. If the seal 1 is a radial seal, for example, the stop shoulders 54 may be arranged at the axial ends of the seal 1. In the case of an end face axial seal 1, the stop shoulders 54 may be arranged at the radial ends of the seal. The at least one stop shoulder 54 on the bearing surface 10 may be adjacent to a recess 14 and thus serve as an additional support lip arranged at the corresponding end of the seal 1.

The stop shoulder 54 may be aligned at the sealing surface 8 on a plane with the bases 30 between the sealing lips 12. In an embodiment, the stop shoulders 54 are arranged on the bearing surface 10 on a plane with the bearing surface 10 at the support lips 18, in particular at their vertices 32. Consequently, in the non-deformed state, the seal 1 rests on the connector with its ends 56 located in the axial direction A. Accordingly, it may be prevented that the seal 1 is levered open and tilted in the insertion direction when the connector is mated with the mating connector.

In an embodiment, the edge zones 16 of the outer legs of the outer recesses 14 in the axial direction A may extend to the stop shoulder 54 and, together with the stop shoulder, form an outer support lip 18.

If tilting of the seal 1 in the insertion direction is to be prevented, the height 42 of the sealing lips 12 may be less than a height 58 from the vertex 48 of the support lips 18 to the opposite base 30 between the sealing lips 12. In particular, the height 58 from the vertex 48 of the support lips 18 to the opposing base 30 between the sealing lips 12 may correspond to a ratio of about 2:3 with respect to an overall height 60 of the seal 1. Accordingly, the seal 1 has a stable, relatively rigid base that resists tilting of the seal 1 in the insertion direction during the mating process.

In another embodiment, the sealing lips 12 may be configured in such a way that they do not stick to each other in the mated state. This may be achieved, for example, if the sealing lips 12 have a height 42 that is less than or equal to a distance 62 between the adjacent sealing lips 12. In this case, the distance 62 is defined as the distance parallel to the axial direction A between the vertices 32 of the adjacent sealing lips 12. The distance 62 may be about twice the height 42 of the sealing lips 12. Since, according to this embodiment, the sealing lips 12 are prevented from being deflected to a stop at the adjacent sealing lip 12, a clumping together of the sealing lips 12 may be avoided. Such clumping together would drastically reduce the sealing effect as well as the lifetime of the seal 1.

In order to evenly distribute the contact force on the mating connector, the sealing lips 12 may have the same height 42. Furthermore, for a stable fit at least in the non-deformed state of the seal 1, the vertices of the support lips 18 may be arranged on a common planar plane.

Figure 2:
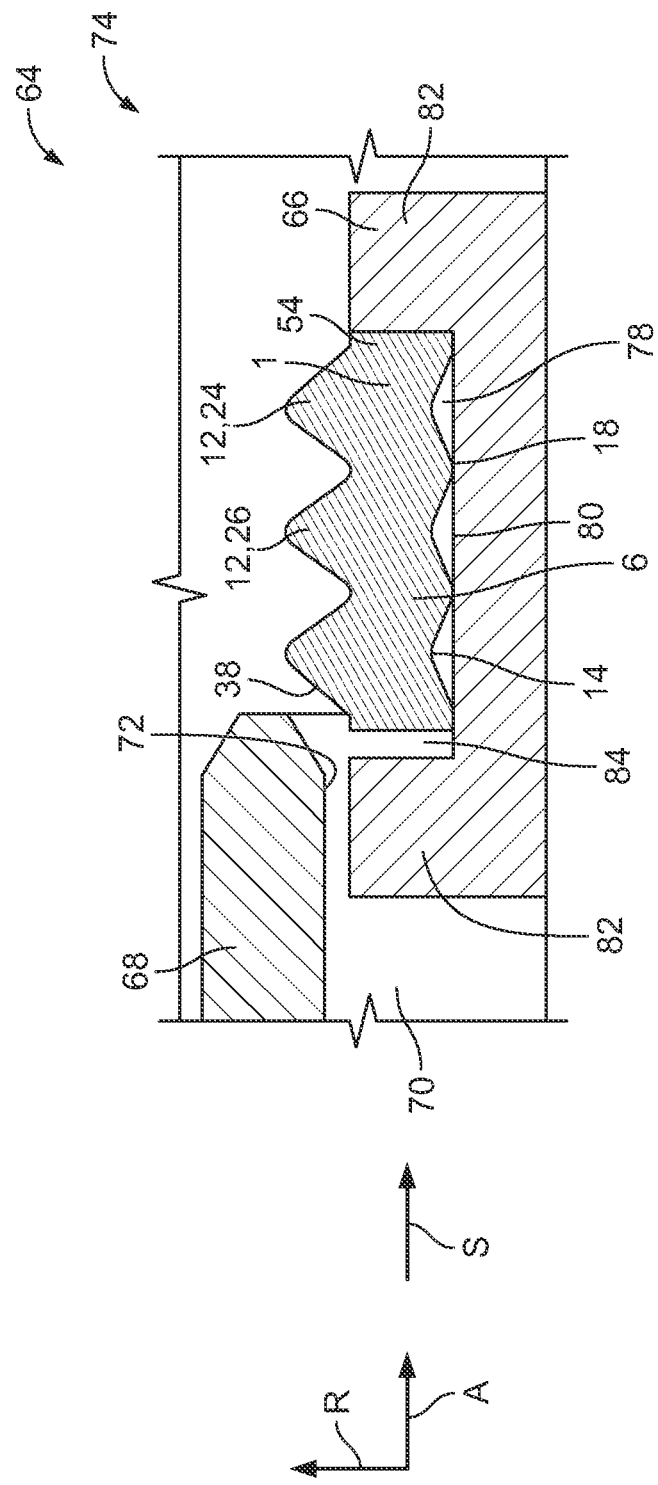
FIG. 2 is a schematic sectional view of the seal of FIG. 1 in a connector arrangement in a non-mated state.
Figure 3:
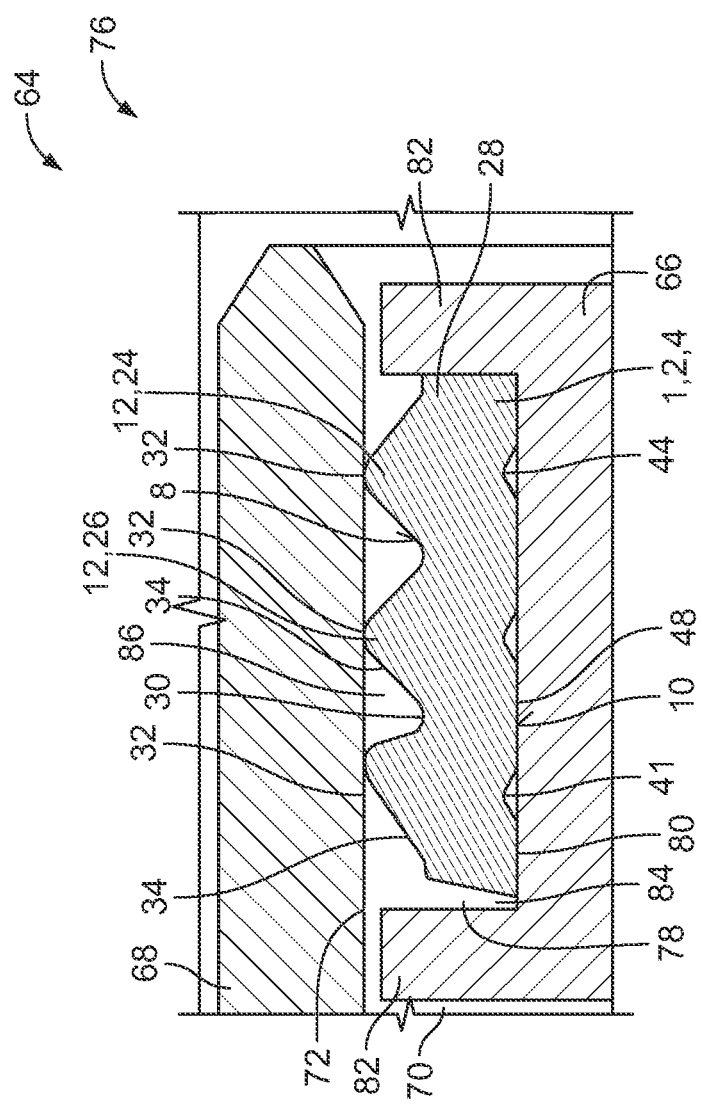
FIG. 3 is a schematic sectional view of the seal of FIG. 1 in the connector arrangement in a mated state.

With reference to FIGS. 2 and 3, in the following the use and effect of the exemplary embodiment of the seal 1 just described will be explained in more detail for a connector arrangement 64.

For clarity, in FIGS. 2 and 3 the components of the connector arrangement 64 are shown only in sections. The connector arrangement 64 includes a connector 66 and a mating connector 68 with a receptacle 70, in which the connector 66 may be received at least in sections. The receptacle 70 is bounded by a wall 72 of the mating connector 68 in the radial direction R.

The mating connector 68 may be connected onto the connector 66 in an insertion direction S. In FIG. 2, the connector arrangement 64 is shown in a non-mated state 74 and in FIG. 3 in a mated state 76.

The electrical connector 66 has a circumferential groove 78, into which the seal 1 is inserted. Here, the seal 1 rests with the support lips 18 in the radial direction R on an outer wall 80 of the connector 66. The recesses 14 form the escape reservoir between the outer wall 80 and the seal 1.

In an embodiment, the axis of symmetry 52 may extend from a base 28 to an opposite vertex 48. Accordingly, an assembly direction, in which the seal 1 may be placed on the connector 66, is freely selectable, whereby the number of incorrectly assembled connectors with seals may be reduced. In this case another advantage is that defects or consequential damage may not be caused by a faulty assembly of the seal, making it easier to resolve warranty disputes.

As is evident from FIGS. 2 and 3, the connector 66 may have radially outwardly projecting projections 82 that delimit the groove in the axial direction A. In this case, the seal 1 may rest against the corresponding projection 82 with its stop shoulder 54 located at the distal end in the insertion direction S. Consequently, displacement of the seal 1 may be prevented during the mating process. At the opposite axial end, a clearance 84 may be provided between the projection 82 and the stop shoulder 54.

The sealing lips 12 project radially from the groove 78. Upon transferring the connector arrangement 64 into the mated state 76 of FIG. 3, the mating connector 68 slides with its wall 72 past the sealing lips 12 and presses them inwardly in the radial direction R. In the process, the sealing lips 12 may deflect into the escape reservoir provided by the recesses 14, causing the depth 22 of the recesses 14 to decrease. In this process, the force acting on the sealing lips 12 exerted by the mating connector 68 is distributed to the offset support lips 18. The support lips 18 thus act as supports 20 that support the corresponding sealing lip 12. Consequently, a counter pressure of the seal 1 is exerted on the wall 72 of the mating connector 68 via the support lips 18, and the seal 1 is thus pressed between the connector 66 and the mating connector 68 in the mated state 76.

The support lips 18 allow the sealing lips 12 to be pressed towards the bearing surface 10 by applying a small amount of force. In the mated state, the sealing lips 12 press against the mating connector 68, where they are supported by the support lips 18 and thus achieve a high sealing force and/or sealing effect.

In the advantageous embodiment, it is intended that the seal lips 12 are not deflected in the insertion direction S such that they stick together and form a lump. Instead, an air cushion 86 is created between the adjacent sealing lips 12, thereby providing an advantageous effect on the sealing effect and the service life of the seal 1.

Electrical connectors are used, for example, in various areas of a vehicle, in particular a motor vehicle, where they are exposed to harsh environmental influences. To reduce the amount of maintenance required, durability of the seal over the entire service life of the connector and/or the vehicle is required. If the sealing lips 12 were to stick together during the mating process and form a lump, this would have a negative effect on the sealing effect and the service life of the seal 1 in use. According to a particularly advantageous embodiment, the height 42 of the sealing lips 12 may be less than or equal to a distance 62 between the sealing lips 12. The distance 62 between the sealing lips 12 may be defined by the distance 62 between the vertices of the adjacent sealing lips 12. The height of the sealing lips 12 may be less than or equal to half the distance 62 between the sealing lips 12.

What is claimed is:

1. A seal for an electrical connector, comprising:
   a sealing surface;
   a bearing surface opposite the sealing surface;
   a plurality of sealing lips protruding on the sealing surface next to one another, one of the sealing lips is asymmetrical;
   a plurality of support lips protruding on the bearing surface; and
   a plurality of recesses on the bearing surface between the support lips, each of the sealing lips is opposite one of the recesses, a distance between two adjacent sealing lips is greater than or equal to a height of the sealing lips.

2. The seal of claim 1, wherein a number of the sealing lips corresponds to a number of the recesses.

3. The seal of claim 1, wherein each of the plurality of sealing lips has a vertex offset from a vertex of each of the support lips.

4. The seal of claim 3, wherein the vertices of the sealing lips are each aligned with one of a plurality of bases of the recesses on the bearing surface.

5. The seal of claim 3, wherein the vertices of the support lips are each aligned with one of a plurality of bases on the sealing surface between adjacent sealing lips.

6. The seal of claim 5, wherein a height from the vertex of one of the support lips to one of the bases between the sealing lips is greater than a height of each of the sealing lips.

7. The seal of claim 6, wherein a ratio of the height from the vertex to the one of the bases to a total height of the seal is 2:3.

8. The seal of claim 6, wherein the distance between the adjacent sealing lips is at least twice the height of the sealing lips.

9. The seal of claim 1, wherein the seal is axially symmetric.

10. The seal of claim 1, further comprising a stop shoulder projecting perpendicular to the sealing lips.

11. The seal of claim 10, wherein the stop shoulder is on a common plane at the bearing surface with the support lips.

12. The seal of claim 10, wherein the height of each of the sealing lips is measured from a top of the stop shoulder to a vertex of each of sealing lips.

13. The seal of claim 1, wherein one of the sealing lips is axially symmetrical.

14. The seal of claim 13, wherein the one of the sealing lips that is asymmetrical is an exterior sealing lip of the sealing lips and the one of the sealing lips that is axially symmetrical is a central sealing lip of the sealing lips.

15. The seal of claim 14, wherein the exterior sealing lip has a flattened approach bevel facing away from the central sealing lip.

16. The seal of claim 1, wherein the sealing lips have an equal height.

17. An electrical connector, comprising:
    a seal including a sealing surface, a bearing surface opposite the sealing surface, a plurality of sealing lips protruding on the sealing surface next to one another, one of the sealing lips is asymmetrical, a plurality of support lips protruding on the bearing surface, and a plurality of recesses on the bearing surface between the support lips, each of the sealing lips is opposite one of the recesses, a distance between two adjacent sealing lips is greater than or equal to a height of the sealing lips.

18. A seal for an electrical connector, comprising:

a sealing surface;

a bearing surface opposite the sealing surface;

a plurality of sealing lips protruding on the sealing surface next to one another;

a plurality of support lips protruding on the bearing surface, each of the plurality of sealing lips has a vertex offset from a vertex of each of the support lips; and a plurality of recesses on the bearing surface between the support lips, each of the sealing lips is opposite one of the recesses, a distance between two adjacent sealing lips is greater than or equal to a height of the sealing lips, the vertices of the support lips are each aligned with one of a plurality of bases on the sealing surface between adjacent sealing lips.

\* \* \* \* \*